(12) United States Patent
Gibson (10) Patent No.: US 7,133,351 B2
(45) Date of Patent: Nov. 7, 2006

(54) DATA STORAGE DEVICE AND A METHOD OF READING DATA IN A DATA STORAGE DEVICE

(75) Inventor: Gary A. Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 651 days.

(21) Appl. No.: 10/632,251

(22) Filed: Aug. 1, 2003

(65) Prior Publication Data

US 2005/0025034 A1    Feb. 3, 2005

(51) Int. Cl.
*G11B 7/00* (2006.01)
(52) U.S. Cl. ..................................... 369/126
(58) Field of Classification Search ............... 369/126, 369/44.11, 44.15, 44.14, 100
See application file for complete search history.

(56) References Cited

U.S. PATENT DOCUMENTS

| 5,721,721 A | * | 2/1998 | Yanagisawa et al. ....... 369/126 |
| 5,856,967 A | | 1/1999 | Mamin et al. |
| 6,519,221 B1 | | 2/2003 | Manalis et al. |

\* cited by examiner

*Primary Examiner*—Nabil Hindi (57) ABSTRACT

The present invention includes a method and apparatus for storing data. Accordingly, a first aspect of the present invention is a data storage device. The data storage device includes a conduction barrier, a probe tip mounted on a suspension mechanism, a voltage source coupled to the suspension mechanism for emitting a current of electrons through the conduction barrier, a sensing mechanism for sensing a magnitude of the emitted current wherein the magnitude of the current of electrons emitted through the conduction barrier is based on a distance between the probe tip and the sensing mechanism.

28 Claims, 5 Drawing Sheets

DATA STORAGE DEVICE AND A METHOD OF READING DATA IN A DATA STORAGE DEVICE

FIELD OF THE INVENTION

The present invention relates generally to data storage media and more particularly to a data storage device and a method of reading data in a data storage device.

BACKGROUND OF THE INVENTION

Storage media for computers and other types of electronic devices generally come in two types: volatile memory and non-volatile memory. Volatile memory loses its contents when power is no longer being supplied to the memory, whereas non-volatile memory maintains its contents even when power is not being supplied to the memory. The most common type of volatile memory is volatile random-access memory (RAM), which is most commonly available as and implemented as an integrated circuit (IC). The term data storage medium is used herein in a broad sense, and encompasses IC memory, as well as other types of data storage media.

By comparison, non-volatile memory has perhaps more commonly been available as and implemented as magnetic and optical media, including hard disk drives, floppy disks, compact disc read-only memories (CD-ROM's), CD re-writable (CD-RW) discs, and digital versatile discs (DVD's), among others. Historically, non-volatile memory implemented as an IC was primarily available as ROM that was not re-recordable, such as hard-wired ROM and programmable ROM (PROM). More recently, IC non-volatile memory has become available as various types of flash memory, which is more technically known as electrically erasable PROM (EEPROM).

It is a general aim for the computer industry to increase the storage density of the storage media being used by computers. Every new technology, however, should offer long-term perspectives in order to give room for continued improvements within the new technology. This is due to the fact that with every fundamental change of storage technology, the computer industry has to undertake remarkable investments in order to adapt existing production machines or to replace existing machines by new ones for any technical purpose involved with said new technology. Thus, the consequence for further development of storage systems is that any new technique with better storage area density should have a long-term potential for further scaling, desirably down to the nanometer or even atomic scale.

The only available tool known today that is simple and yet provides these very long term perspectives is a nanometer probe tip. Such tips are used in every atomic force microscope (AFM) and scanning tunneling microscope (STM) for imaging and structuring down to the atomic scale. The simple tip is a very reliable tool that concentrates on one functionality: the ultimate local confinement of interaction.

In recent years, AFM thermo-mechanical recording in polymer storage media has undergone extensive modifications mainly with respect to the integration of sensors and heaters designed to enhance simplicity and to increase data rate and storage density. Using heater cantilevers, thermo-mechanical recording at 400 Gb/in.sup.2 storage density and data rates of a few Mb/s for reading and 100 kb/s for writing have been demonstrated.

Such prior art thermo-mechanical writing is a combination of applying a local force by the cantilever/tip to a polymer layer and softening it by local heating. By applying sufficient heat an indentation can be formed into the storage medium for writing a bit which can be read back with the same tip, by the fact that the lever is bent when it is moved into the indentation and the electrical resistance of a sensing circuit is changed therewith.

While writing data or bits, the heat transfer from the tip to the polymer through the small contact area is initially very poor and improves as the contact area increases. This means the tip must be heated to a relatively high temperature to initiate the melting process. Once melting has commenced, the tip is pressed into the polymer, which increases the heat transfer to the polymer, increases the volume of melted polymer, and hence increases the bit size. After melting has started and the contact area has increased, the heating power available for generating the indentations increases by at least ten times to become 2% or more of the total heating power (depending on the design). Once the bits are written, it is crucial that the read process is conducted as efficiently as possible.

Accordingly, what is needed is a method and system that is capable of reading these bits in an efficient and expeditious fashion. The method and system should be simple and capable of being easily adapted to existing technology. The present invention addresses these needs.

SUMMARY OF THE INVENTION

The present invention includes a data storage device and a method of reading data in a data storage device. Accordingly, a first aspect of the present invention is a data storage device. The data storage device includes a conduction barrier, a probe tip mounted on a suspension mechanism, a voltage source coupled to the suspension mechanism for emitting a current of electrons through the conduction barrier and a sensing mechanism for sensing a magnitude of the emitted current wherein the magnitude of the emitted current of electrons is based on a distance between the probe tip and the sensing mechanism.

A second aspect of the present invention is a method of reading data in a data storage device. The method includes providing a conduction barrier wherein the conduction barrier includes a data storage medium, suspending a probe tip over the conduction barrier via a suspension mechanism, emitting a current of electrons through the conduction barrier from a voltage source coupled to the suspension mechanism and sensing a magnitude of the current of electrons emitted from the voltage source with a sensing mechanism wherein the magnitude of the emitted current of electrons is based on a distance between the probe tip and the sensing mechanism.

Other aspects and advantages of the present invention will become apparent from the following detailed description, taken in conjunction with the accompanying drawings, illustrating by way of example the principles of the invention.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

The present invention relates to a data storage device and a method of reading data in a data storage device. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

Based on varying embodiments of the present invention, a data storage device and a method of reading data in a data storage device are disclosed. Accordingly, a conductive path is built into a probe tip and its suspension mechanism wherein the path is coupled to a voltage supply so that a voltage can be applied to the probe tip and/or portions of the suspension. As the probe tip is scanned over a storage medium, a gap between the tip and the underlying storage medium varies as the tip encounters bits in the storage medium. As the gap between the tip and the underlying storage medium changes, a monitorable current of electrons, whose magnitude depends on this gap, can be injected via the voltage source into a current sensing mechanism. Accordingly, a readout scheme can be implemented whereby the current of electrons and, thereby, the presence of bits in the storage medium, is monitored by the current sensing mechanism.

Figure 1:
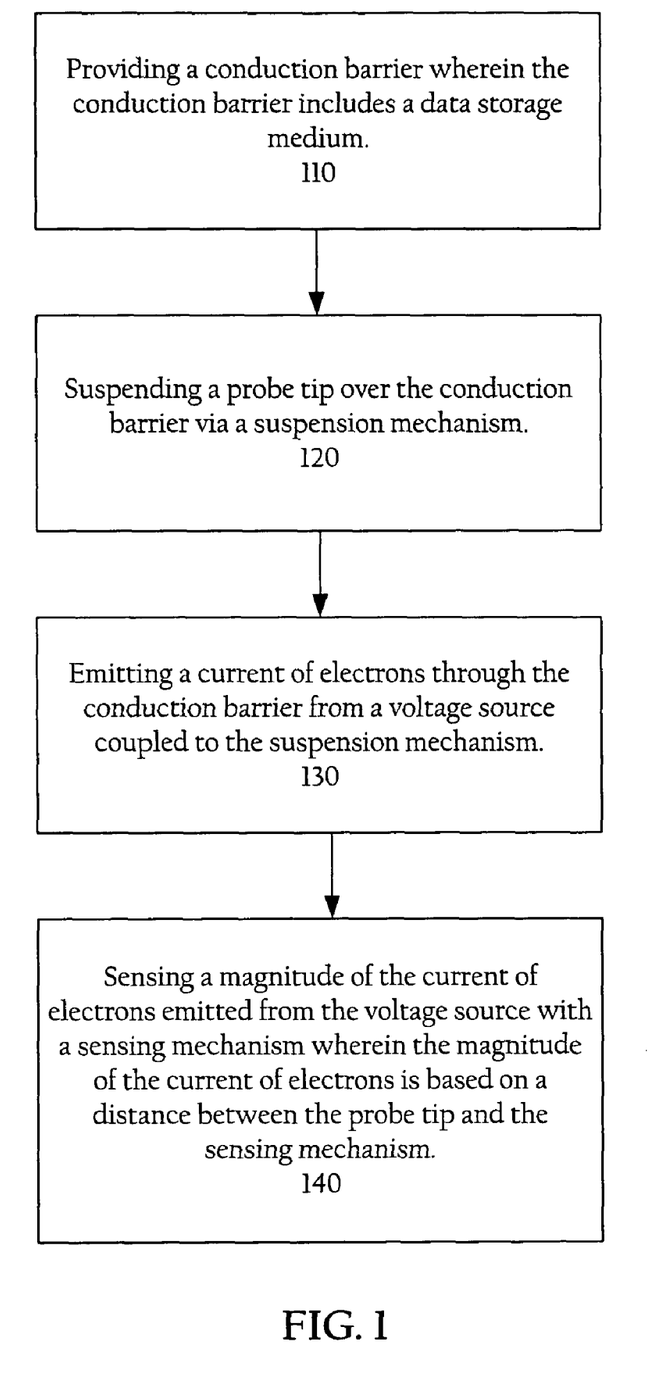
FIG. 1 is a flowchart of a method in accordance with an embodiment of the present invention.

FIG. 1 shows a high-level flowchart of a method in accordance with an embodiment of the present invention. A first step 110 involves providing a conduction barrier wherein the conduction barrier includes a data storage medium. A second step 120 involves suspending a probe tip over the conduction barrier via a suspension mechanism. A third step 130 involves emitting a current of electrons through the conduction barrier from a voltage source coupled to the suspension mechanism. A final step 140 involves sensing a magnitude of the current of electrons emitted from the voltage source with a sensing mechanism wherein the magnitude of the current of electrons is based on a distance between the probe tip and the sensing mechanism. In an embodiment, the distance between the probe tip and the sensing mechanism changes when the probe tip encounters a bit in the topography of the data storage medium.

Figure 2:
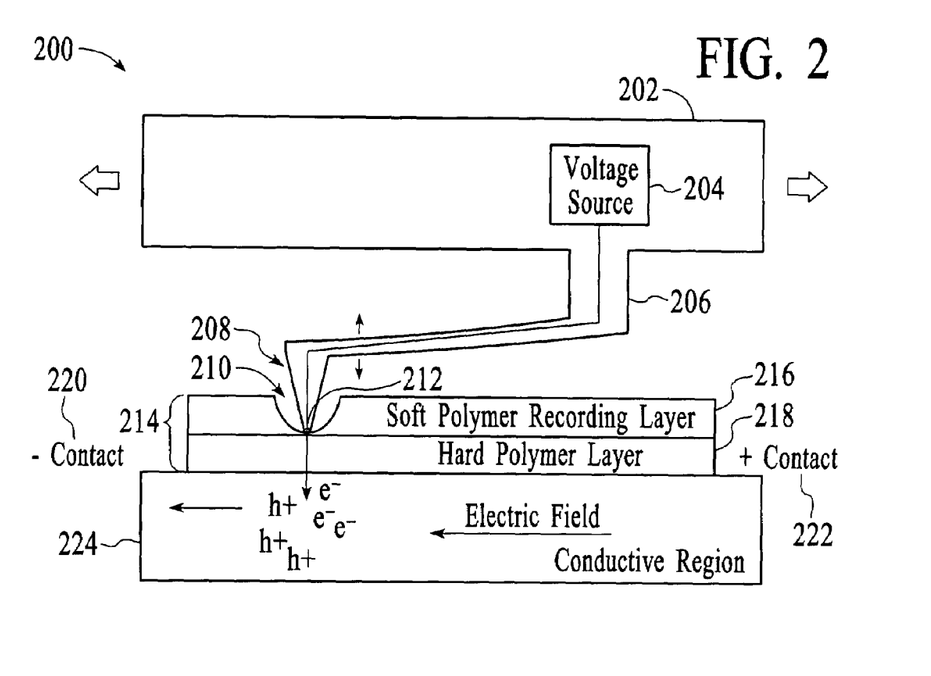
FIG. 2 is an illustration of a data storage system in accordance with an embodiment of the present invention.

FIG. 2 is an illustration of a system 200 for storing data in accordance with an embodiment of the present invention. The system 200 includes a suspension mechanism 202 that includes a voltage source 204 and a cantilever 206. A probe tip 208 is coupled to the cantilever 206 wherein the probe tip 208 includes an electron emitter 212 that is coupled to the voltage source 204.

The system 200 also includes a conduction barrier 214, two electrical contacts 220, 222 and a conduction region 224. The two electrical contacts 220, 222 and the conduction region 224 form a sensing mechanism for sensing a change in the current of electrons that are emitted through the conduction barrier 214 from the electron emitter 212.

In an embodiment, the conduction barrier 214 includes two polymer layers 216, 218. The first polymer layer 216 serves as a data storage medium whereby data is stored on the first polymer layer 216 in the form of a bit 210. The second polymer layer 218 acts to limit the depth of the bit(s) 210 in the first polymer layer 216. In an embodiment, the first polymer layer 216 is a soft polymer layer (e.g. polymethylmethacrylate) whereas the second polymer layer 218 is harder (e.g. SU8). Although the second polymer layer 218 is somewhat harder than the first polymer layer 216, the second polymer layer 218 should still be soft enough to help protect the probe tip 208 from wear and shock.

Accordingly, data is read from the first polymer layer 216 by scanning the probe tip 208 over the first polymer layer 216. As the probe tip 208 is scanned over the first polymer layer 216, the probe tip 208 encounters a bit 210 and the gap between the tip 208 and the conduction region 224 changes. A bit 210 can be a pit a hill or any other change in the topography of the storage medium 212. When the gap between the probe tip 208 and the conduction region 224 decreases, energetic electrons are injected from the electron emitter 212 into the conduction region 224. A tip voltage is employed whereby when the probe tip 208 and conduction region 224 are separated by the full thickness of the conduction barrier 214, electrons are injected into the conduction region 224 at a negligible rate.

When the probe tip 208 moves into a bit 210, the magnitude of electrons being injected through the conduction barrier significantly increases. These injected electrons will have a distribution of energies that depends upon the applied voltage and the distribution of available states in the conductive material (which depends on the band structure and temperature of the conductive material). Injected electrons with sufficient energy will lose energy through the creation of electron-hole pairs. An electron energy, E, will create approximately:

$$E/(2.1E_g+1.3) \tag{1}$$

electron-hole pairs, where $E_g$ is the bandgap of the conduction region 224 and the energies are measured in electron volts.

When the electric field at the probe tip 208 is large enough (typically on the order of a few V per nm), electrons are field-emitted from the tip. As the gap between the probe tip 208 and conduction region 224 changes, the electric field at the probe tip 208 changes. Accordingly, a tip voltage is chosen whereby the field-emitted current can vary from very low to reasonably high as the topography of the first polymer layer 216 changes the gap between the probe tip 208 and the conduction region 224. The optimal tip voltage depends on the geometry of the probe tip 208 and the dielectric constant of the conduction barrier 214 between the probe tip 208 and conduction region 224.

Alternatively, electrons may be injected from the probe tip into the conduction region 224 via other processes such as quantum mechanical tunneling through all or part of the conduction barrier 214, resonant tunneling, Mott hopping, or some combination of electrical conduction processes. Again, the result is that a current of electrons with a distribution of energies are injected into the conduction region 224. As the conduction barrier 214 becomes thinner (e.g. as the probe tip 208 moves into a bit 210), the number of injected electrons will increase and, in some cases, the energy distribution of the injected electrons is shifted. With sufficient energy, these injected electrons create electron-hole pairs in accordance with equation (1) above.

Once the electron-hole pairs are created in the conduction region 224, these generated carriers can be separated by the application of an electric field. In an embodiment, the conduction region 224 includes a cathodoconductor/cathodoconductive material. A cathodoconductor is a material that can be made more conductive when illuminated by a beam of sufficiently energetic electrons. A single energetic incident electron can create many electron-hole pairs. These additional carriers increase the conductivity of the material. This is analogous to the creation of electron-hole pairs and the resulting increase in conductivity, in a photoconductor that is illuminated with light.

Accordingly, the two electrical contacts 220, 222 are coupled to the cathodoconductive region 224 to create an electric field that is primarily in the plane of the cathodoconductive region 224. The separation of electrons from holes and their transport toward the appropriate contact causes a cathodoconductive signal current flow that can be monitored at either contact 220, 222. Note that in some cases it may be advantageous to use rectifying contacts for one or both of contacts 220 and 222. Rectifying contacts of the appropriate polarity can reduce unwanted leakage currents between the contacts that compete with the signal current.

The cathodoconductive signal current can be many times the generation current (The generation current equals the number of electrons or holes generated per second by the injection current. As described above, the generation current can, in turn, be many times the injection current). For a given bias between the contacts 220, 222, the cathodoconductive signal current may be increased by increasing the ratio a/b where a is the distance a carrier travels before recombination and b is the distance between the contacts 220, 222.

Somewhat more precisely, the ratio of cathodoconductive current to generation current is:

$$s/d = \mu E \tau_r / d = \tau_r / \tau_d \quad (2)$$

where $s = \mu E \tau_r$ is the "Schubweg" or mean free path before recombination, $\mu$ is the mobility, $\tau_r$ is the recombination lifetime, $\tau_d$ is the transit time between contacts 220, 222 and d is the distance between the contacts 220, 222.

Overall, there are two signal current gain mechanisms built into the system 200. The first results from the fact that many electron-hole pairs can be generated in the conduction region 224 for each injected electron. The second results from the fact that the cathodocurrent passing through the contacts 220, 222 can be much larger the generation current if the mean distance traveled by the generated carriers is longer than the distance between the contacts 220, 222. The magnitude of the cathodoconductive current depends on the voltages applied to the probe tip 208 and contacts 220, 222, the geometry (e.g. the distance between contacts 220, 222), conductor material bandgap, etc. In general, there is a tradeoff between cathodoconductive gain and bandwidth (frequency response of the signal currents), but the gain-bandwidth product of the cathodoconductor material can be very high.

It should be noted the above-described scheme can be employed with any storage medium in which bits are stored topographically. Accordingly, the data storage medium can be any material or set of materials in which bits can be stored topographically. The bits can be either pits or protrusions, or combinations of both and written by means other than thermal writing. Additionally, multiple probe tips and conductive materials (regions) can be used in parallel to achieve higher data read and write rates. Furthermore, a single conductive region can be used for multiple probe tips. However, there must be at least one conductive region for each probe tip that is active at a given time.

Figure 3:
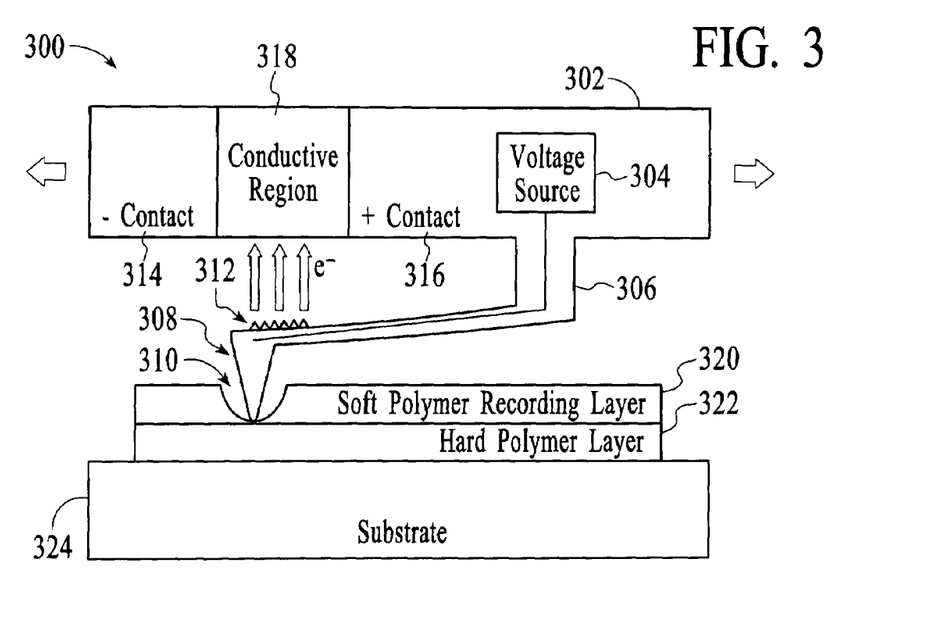
FIG. 3 is an illustration of a data storage system in accordance with an alternate embodiment of the present invention.

In an alternate embodiment, the sensing mechanism (i.e. the contacts and the conduction region) can be built onto the same platform as the micro-machined suspension mechanism. FIG. 3 is an illustration of a data storage system 300 in accordance with an alternate embodiment of the present invention. Similar to system 200 (see FIG. 2), data storage system 300 includes a suspension mechanism 302 that includes a voltage source 304 and a cantilever 306. A probe tip 308 and an electron emitter 312 are coupled to the cantilever 306 wherein the electron emitter 312 is coupled to the voltage source 304. The electron emitter 312 need not consist of a single, sharp point. It could be a number of sharp points or an extended flat emitter. Emitters with a larger total emission area are advantageous in that fractional fluctuations in emitted current tend to be less when statistically averaged over a larger emission area. A soft polymer layer 320 serves as a data storage medium whereas a harder polymer layer 322 limits the depth of the bit(s) 310 in the soft polymer layer 320. The harder polymer layer 322 is deposited upon a substrate 324 such as silicon.

The system 300 also includes a sensing mechanism wherein the sensing mechanism includes two contacts 314, 316 and a conduction region 318. However, in system 300, the two contacts 314, 316 and the conduction region 318 are built onto the same platform as the suspension mechanism 302. However, in this embodiment, a greater number of electrons are injected into the conduction region 316 from the electron emitter 312 when the probe tip 308 moves out of the bit 310. Accordingly, the mathematical/electrical relationships that were described above apply to the system 300.

Figure 4:
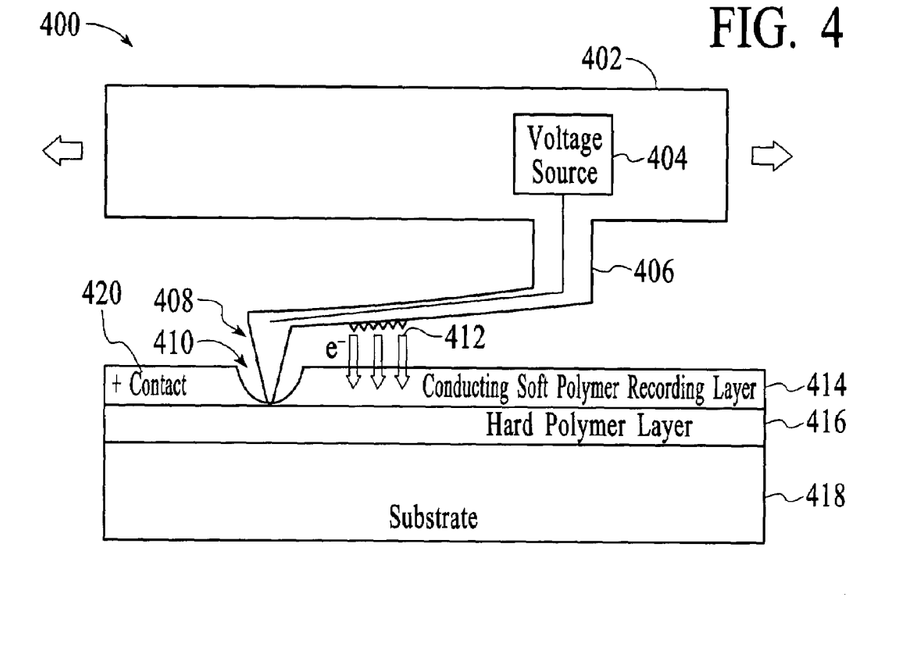
FIG. 4 shows a data storage system in accordance with another embodiment of the present invention.

In accordance with an alternate embodiment of the present invention, it is not necessary to include the sensing mechanism as described in system 200 and 300 if the emission of electrons can be sensed directly from the storage medium. FIG. 4 shows a data storage system 400 in accordance with yet another embodiment of the present invention. Similar to system 300, system 400 includes a suspension mechanism 402 that includes a voltage source 404 and a cantilever 406. A probe tip 408 and an electron emitter 412 are coupled to the cantilever 406 wherein the electron emitter 412 is coupled to the voltage source 404. However, system 400 includes a conducting layer 414 that serves as a data storage medium along with a harder polymer layer 416 that is deposited upon a substrate 418 such as silicon.

According to the embodiment of FIG. 4, the conducting layer 414 can act as an anode for collecting electrons emitted from the electron emitter 412. If this is the case, only one contact 420 needs to be connected to it. This contact 420 could be connected to a current monitor for detecting the magnitude of the emitted current or it could be connected to a voltage source. In the latter case, the emitted current could be monitored on the probe side of the system 400.

Additionally, if a large emission area is implemented, the noise in the emission current can be minimized. However, if the emission current is primarily from the cantilever to either the cantilever platform or the storage medium 402, then the fractional change in emission current due to a shallow bit 410 will be small because the fractional changes in these "emission gaps" will be small. Note that it is also possible to monitor the ratio of "up" to "down" emissions.

Figure 5:
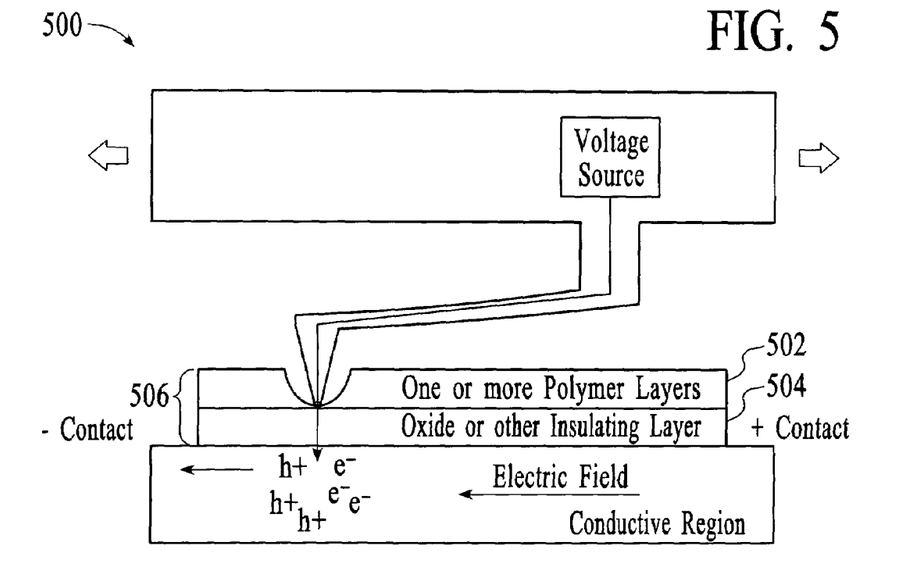
FIG. 5 shows a data storage system in accordance with yet another embodiment of the present invention.

In yet another alternate embodiment of the present invention, an insulating layer could be employed as all or part of the conduction barrier. FIG. 5 shows a data storage system 500 in accordance with an alternate embodiment of the present invention. The system 500 includes a conduction barrier 506 whereby the conduction barrier 506 includes one or more polymer layers 502 and an insulating layer 504. In an embodiment, the insulating layer 504 is a layer of oxide or the like. Accordingly, the employment of an insulating layer 504 could have advantages in terms of robustness, breakdown voltage and uniformity of the barrier. The insulating layer 504 can be employed, for example, in conjunction with the cathodoconductive readout utilized in system 200.

Figure 6:
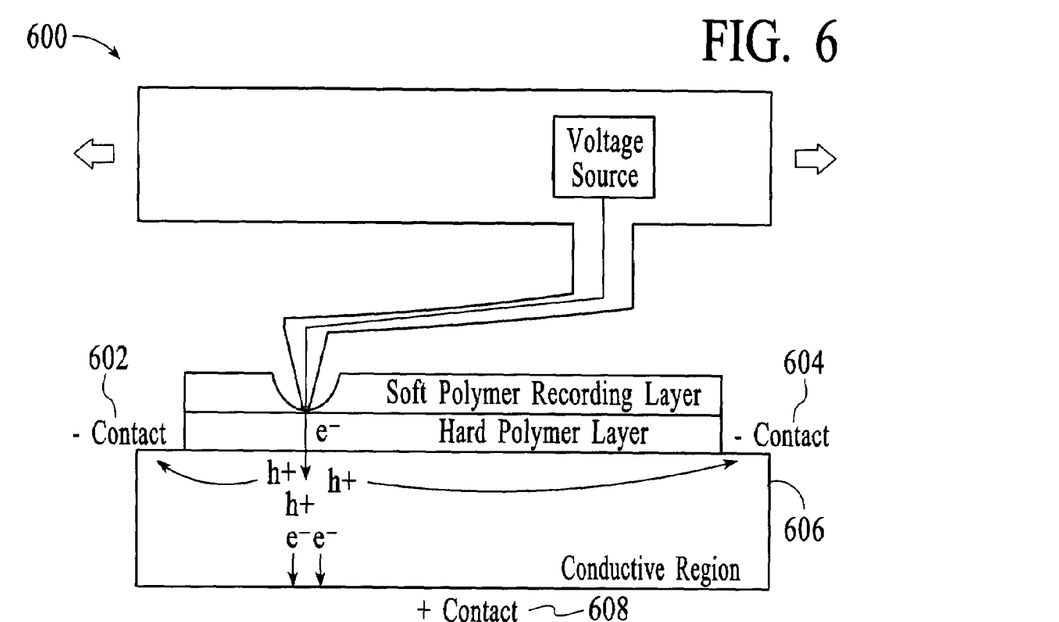
FIG. 6 shows a data storage system in accordance with yet another embodiment of the present invention.

Furthermore, the electrical contacts can be configured in a variety of different geometric formations. Accordingly, in yet another embodiment of the present invention, the electrical contacts are aligned vertically with respect to the conductive region. FIG. 6 shows an embodiment of data storage system 600 in accordance with another embodiment of the present invention. The system 600 includes contacts 602, 604, 608 that are aligned in a vertical fashion with respect to the conductive region 606.

This could have advantages in terms of higher fields and larger conductive gains (due to smaller contact spacings), reduced dependence of the signal on the position of the probe relative to the media contacts and reduced sensitivity of the signal to surface problems such as band-bending and surface recombination. These surface problems can reduce the conductive gain by trapping and/or recombining the generated carriers. Accordingly, these potential problems can be ameliorated by employing vertical contacts 602, 604, 608 whereby the electric field accelerates generated carriers away from the surface.

Figure 7:
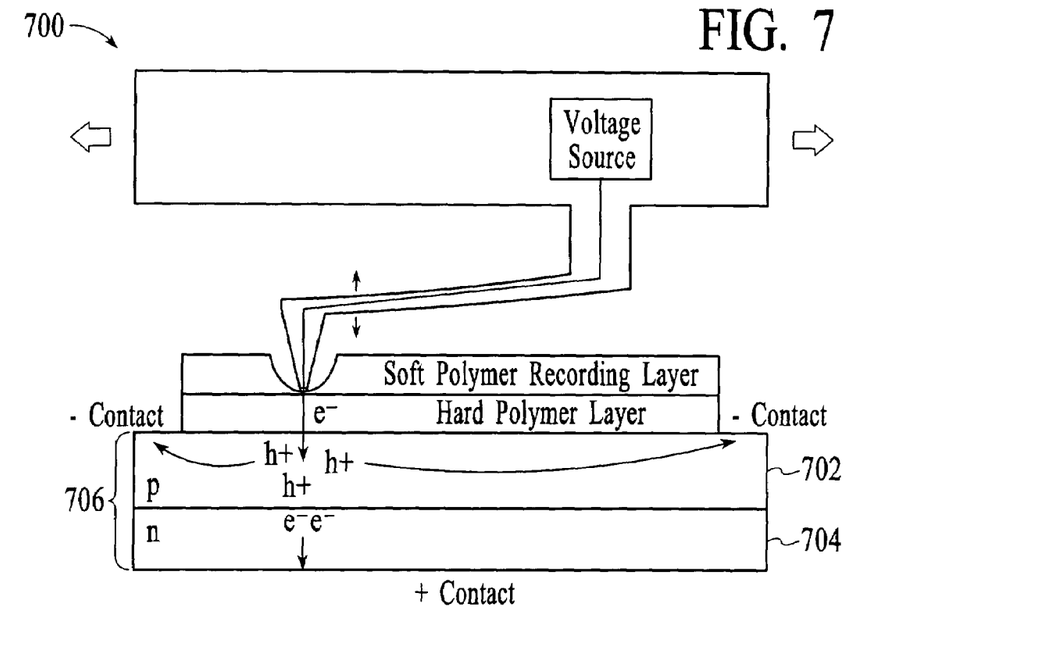
FIG. 7 shows a data storage system in accordance with yet another embodiment of the present invention.

Furthermore, a variety of other types of charged-particle detectors could be implemented while remaining within the spirit and scope of the present invention. For example, in another embodiment of the present invention, a cathododiode could be employed. FIG. 7 shows an embodiment of data storage system 700 in accordance with another embodiment of the present invention. The system 700 includes a cathododiode 706 wherein the cathododiode 706 includes a p region 702 and an n region 704.

Consequently, electron-hole pairs generated in one region of the cathododiode 706 would be separated by a combination of built in and applied fields. Carriers would then be swept across the diode interface resulting in a signal current in the biasing circuit of the cathododiode 706.

Alternatively, other devices containing semi-conducting regions (cathodotransistors, avalanche diodes, etc.) in which energetic incident electrons can create electron-hole pairs, along with a mechanism for detecting these generated carriers, can be employed while remaining within the spirit and scope of the present invention.

When generating electron-hole pairs in a semi-conducting material with energetic incident electrons, the output signal is proportional to the power injected into the semiconductor rather than the current. This is advantageous because it is easier to regulate the injected power as opposed to the injected current. To hold the injected current nearly constant requires a large dynamic resistance. To hold the injected power constant, requires much smaller dynamic resistance.

Figure 8:
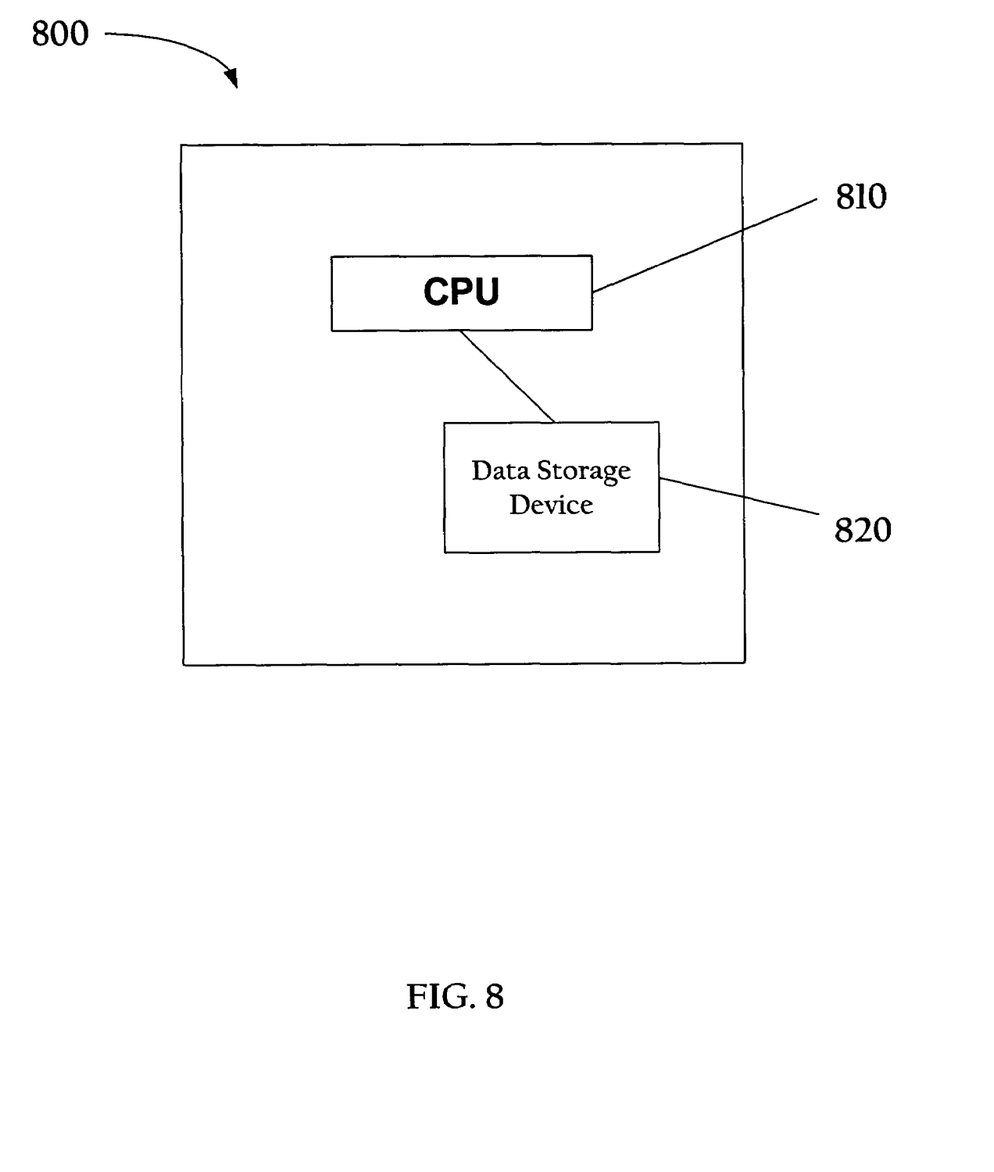
FIG. 8 shows a computer system in accordance with another embodiment of the present invention.

Another embodiment of the present invention includes a computer system that implements a data storage device in accordance with the present invention. FIG. 8 shows a computer system 800 in accordance with an alternate embodiment of the present invention. The computer system 800 includes a central processing unit (CPU) 810 coupled to a data storage device 820. It should be understood that the data storage device 820 could be one of the above-described embodiments of data storage devices.

A data storage device and a method of reading data in a data storage device has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. A data storage device comprising:
   a conduction barrier;
   a probe tip mounted on a suspension mechanism;
   a voltage source coupled to the suspension mechanism for emitting a current of electrons through the conduction barrier; and
   a sensing mechanism for sensing a magnitude of the emitted current wherein the magnitude of the current of electrons is based on a distance between the probe tip and the sensing mechanism.

2. The data storage device of claim 1 wherein the sensing mechanism further comprises:
   a conduction region coupled to the conduction barrier; and
   at least two electrical contacts coupled to the conduction region for monitoring the current induced in the conduction region by the current of electrons emitted from the probe tip.

3. The data storage device of claim 2 wherein the conduction region comprises a cathodoconductive material.

4. The data storage device of claim 2 wherein the at least two electrical contacts are aligned in a vertical fashion with respect to the conduction region.

5. The data storage device of claim 1 wherein the conduction barrier further comprises at least one layer of polymer material.

6. The data storage device of claim 5 wherein the at least one layer of polymer material comprises a wear resistant polymer material.

7. The data storage device of claim 5 wherein the polymer material is a topographic data storage medium.

8. The data storage device of claim 6 wherein the conduction barrier further comprises a second layer of material wherein the second layer of material comprises a second polymer material wherein the second polymer material is harder than the first polymer material.

9. The data storage device of claim 1 wherein the suspension mechanism and the sensing mechanism are both built onto a platform.

10. The data storage device of claim 1 further comprising:
    an anode coupled to the conduction barrier wherein the anode comprises a conductive layer of material; and
    wherein the sensing mechanism includes at least one electrical contact coupled to the anode for monitoring the magnitude of the current of electrons.

11. The data storage device of claim 1 further comprising an insulating layer as part of the conduction barrier.

12. The data storage device of claim 11 wherein the insulating layer further comprises an oxide layer.

13. The data storage device of claim 1 wherein the sensing mechanism further comprises a charged particle detector.

14. The data storage device of claim 13 wherein the charged particle detector comprises at least one of a cathododiode, a cathodotransistor or an avalanche diode.

15. The data storage device of claim 1 wherein the voltage source is coupled to the probe tip.

16. A method of reading data in data storage device comprising:
    providing a conduction barrier wherein the conduction barrier includes a data storage medium;
    suspending a probe tip over the conduction barrier via a suspension mechanism;
    emitting a current of electrons through the conduction barrier from a voltage source coupled to the suspension mechanism; and
    sensing a magnitude of the current of electrons emitted from the voltage source with a sensing mechanism wherein the magnitude of the current of electrons is based on a distance between the probe tip and the sensing mechanism.

17. The method of claim 16 wherein the act of sensing a magnitude of the current further comprises:
    coupling a conduction region to the conduction barrier; and
    coupling at least two electrical contacts to the conduction region for monitoring the current induced in the conduction region by the electrons emitted from the voltage source.

18. The method of claim 17 wherein the conduction region comprises a cathodoconductive material.

19. The method of claim 17 wherein coupling the at least two electrical contacts to the conduction region further comprises coupling the at least two electrical contacts to the conduction region in a vertical fashion.

20. The method of claim 16 further comprising the act of:
    building a conduction region into the suspension mechanism.

21. The method of claim 16 wherein the act of providing a conduction barrier further comprises:
    coupling an anode to the conduction barrier wherein the anode comprises a conductive layer of material.

22. The method of claim 21 wherein the act of sensing a change in current further comprises:
    coupling at least one electrical contact to the conductive layer of material for monitoring the current of electrons emitted from the voltage source.

23. The method of claim 16 wherein the act of providing a conduction barrier further comprises:
    including an insulating layer in the conduction barrier.

24. The method of claim 23 wherein the insulating layer further comprises an oxide layer.

25. The method of claim 16 wherein the act of sensing a magnitude of current based on the current of electrons emitted from the voltage source with a sensing mechanism further comprises:
    coupling a charged particle detector to the conduction barrier.

26. The method of claim 25 wherein the charged particle detector comprises at least one of a cathododiode, a cathodotransistor or an avalanche diode.

27. A data storage system comprising:
    means for providing a conduction barrier wherein the conduction barrier includes a data storage medium;
    means for suspending a probe tip over the conduction barrier via a suspension mechanism;
    means for emitting a current of electrons through the conduction barrier from a voltage source connected to an emitting region of the suspension mechanism; and
    means for sensing a magnitude of the current of electrons emitted from the voltage source with a sensing mechanism wherein the magnitude of the current of electrons is based on a distance between the probe tip and the sensing mechanism.

28. A computer system comprising:
    a central processing unit; and
    a data storage device coupled to the central processing unit comprising:
    a conduction barrier;
    a probe tip mounted on a suspension mechanism;
    a voltage source coupled to the suspension mechanism for emitting a current of electrons through the conduction barrier; and
    a sensing mechanism for sensing a magnitude of the emitted current wherein the magnitude of the current of electrons is based on a distance between the probe tip and the sensing mechanism.

* * * * *